United States Patent
Ginsberg et al.

(10) Patent No.: US 10,902,039 B2
(45) Date of Patent: *Jan. 26, 2021

(54) AUTOMATIC IDENTIFICATION OF RETRAINING DATA IN A CLASSIFIER-BASED DIALOGUE SYSTEM

(71) Applicant: INTERNATIONAL BUSINESS MACHINES CORPORATION, Armonk, NY (US)

(72) Inventors: Allen Ginsberg, St. Petersburg, FL (US); Edward G. Katz, Washington, DC (US); Alexander C. Tonetti, Washington, DC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/451,092

(22) Filed: Jun. 25, 2019

(65) Prior Publication Data

US 2019/0311000 A1 Oct. 10, 2019

Related U.S. Application Data

(63) Continuation of application No. 15/814,473, filed on Nov. 16, 2017, now Pat. No. 10,372,737.

(51) Int. Cl.
*G06F 16/332* (2019.01)
*G10L 15/183* (2013.01)
(Continued)

(52) U.S. Cl.
CPC .......... *G06F 16/3329* (2019.01); *G06F 40/35* (2020.01); *G10L 15/183* (2013.01);
(Continued)

(58) Field of Classification Search
CPC .............. G06F 16/3329; G10L 15/183; G10L 15/1815; G10L 15/22; G10L 2015/0635; G10L 2015/0631
See application file for complete search history.

(56) References Cited

U.S. PATENT DOCUMENTS 5,806,030 A 9/1998 Junqua
6,298,351 B1 10/2001 Castelli
(Continued)

OTHER PUBLICATIONS

Bohus et al., "A Principled Approach for Rejection Threshold Optimization in Spoken Dialog Systems", Computer Science Department, Paper 1384, http://repository.cmu.edu/compsci/1384, Jan. 1, 2005, pp. 1-6.

(Continued)

*Primary Examiner* — Brian L Albertalli
(74) *Attorney, Agent, or Firm* — Robert D. Bean

(57) ABSTRACT

According to one embodiment, a method, computer system, and computer program product for retraining a classifier-based automatic dialogue system with recorded user interactions is provided. The present invention may include receiving recorded interactions, where the interactions are between a user and an automatic dialogue system; determining, based on the recorded interactions, whether to pair a given input with one or more classes; pairing inputs with one or more classes; assessing the reliability of the paired inputs and classes; determining whether the reliable paired inputs and classes can be consistently mapped; and merging all consistently mapped reliable pairs with an initial training set.

20 Claims, 5 Drawing Sheets

(51) Int. Cl.
*G10L 15/18* (2013.01)
*G10L 15/22* (2006.01)
*G06F 40/35* (2020.01)
*G10L 15/06* (2013.01)

(52) U.S. Cl.
CPC .......... *G10L 15/1815* (2013.01); *G10L 15/22* (2013.01); *G10L 2015/0631* (2013.01); *G10L 2015/0635* (2013.01)

(56) References Cited

U.S. PATENT DOCUMENTS

| | | | |
|---|---|---|---|
| 6,374,221 | B1 | 4/2002 | Haimi-Cohen |
| 6,789,062 | B1 | 9/2004 | Phillips |
| 7,092,888 | B1 | 8/2006 | McCarthy |
| 7,158,935 | B1 | 1/2007 | Gorin |
| 7,440,893 | B1 | 10/2008 | Gorin |
| 7,660,715 | B1 | 2/2010 | Thambiratnam |
| 8,738,379 | B2 | 5/2014 | Tur |
| 8,781,833 | B2 | 7/2014 | Duta |
| 8,886,532 | B2 | 11/2014 | Levit |
| 8,990,126 | B1 | 3/2015 | Bangalore |
| 9,123,332 | B1 | 9/2015 | Witt-Ehsani |
| 9,269,354 | B2 | 2/2016 | Gandrabur |
| 9,620,117 | B1 | 4/2017 | Gilbert |
| 2003/0036903 | A1 | 2/2003 | Konopka |
| 2013/0159000 | A1 | 6/2013 | Ju |
| 2014/0324429 | A1 | 10/2014 | Weilhammer |
| 2015/0279353 | A1 | 10/2015 | Itoh |
| 2016/0379106 | A1 | 12/2016 | Qi |
| 2019/0147099 | A1 | 6/2019 | Ginsberg et al. |

OTHER PUBLICATIONS

Damljanovic et al., "Improving Habitability of Natural Language Interfaces for Querying Ontologies with Feedback and Clarification Dialogues", Journal of Web Semantics, Feb. 8, 2013, pp. 1-25.

Mell et al., "The NIST Definition of Cloud Computing," U.S. Department of Commerce, National Institute of Standards and Technology, Sep. 2011, pp. 1-7, Special Publication 800-145.

Schlangen, "Causes and Strategies for Requesting Clarification in Dialogue", Proceedings of the 5th SIGdial Workshop on Discourse and Dialogue at HLT-NAACL 2004, Apr. 30-May 1, 2004, Cambridge, Massachusetts, USA, pp. 1-8.

Ultes et al., "User-centred Adaptive Spoken Dialogue Modelling", Dissertation, Ulm University, Nov. 20, 2015, pp. 1-196.

IBM: List of IBM Patents or Patent Applications Treated As Related (Appendix P), Jun. 24, 2019, 2 pages.

AUTOMATIC IDENTIFICATION OF RETRAINING DATA IN A CLASSIFIER-BASED DIALOGUE SYSTEM

BACKGROUND

The present invention relates, generally, to the field of computing, and more particularly to natural language processing.

Natural language processing is a field of computing concerned with in-context interactions between computers and humans using natural languages. As computing power has become cheaper, faster, and more powerful, many companies are rushing to develop personal assistants capable of communicating with humans using natural language based within phones, tablets, computer operating systems and even purpose-built home automation appliances to provide intuitive machine-man interfacing. As such, the field of natural language processing has massively grown in relevance in recent years, and streamlining the process is of immense commercial importance. A primary goal of the field is to enable computers to accurately process a human user's natural language queries. Achieving this goal requires that computers understand not only the denotative meaning of the text, but the connotative meaning as well; the definition of words can change depending on context. Consequently, an understanding of natural language requires an understanding of the context within which that language appears.

SUMMARY

According to one embodiment, a method, computer system, and computer program product for retraining a classifier-based automatic dialogue system with recorded user interactions is provided. The present invention may include receiving recorded interactions, where the interactions are between a user and an automatic dialogue system; determining, based on the recorded interactions, whether to pair a given input with one or more classes; pairing inputs with one or more classes; assessing the reliability of the paired inputs and classes; determining whether the reliable paired inputs and classes can be consistently mapped; and merging all consistently mapped reliable pairs with an initial training set.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
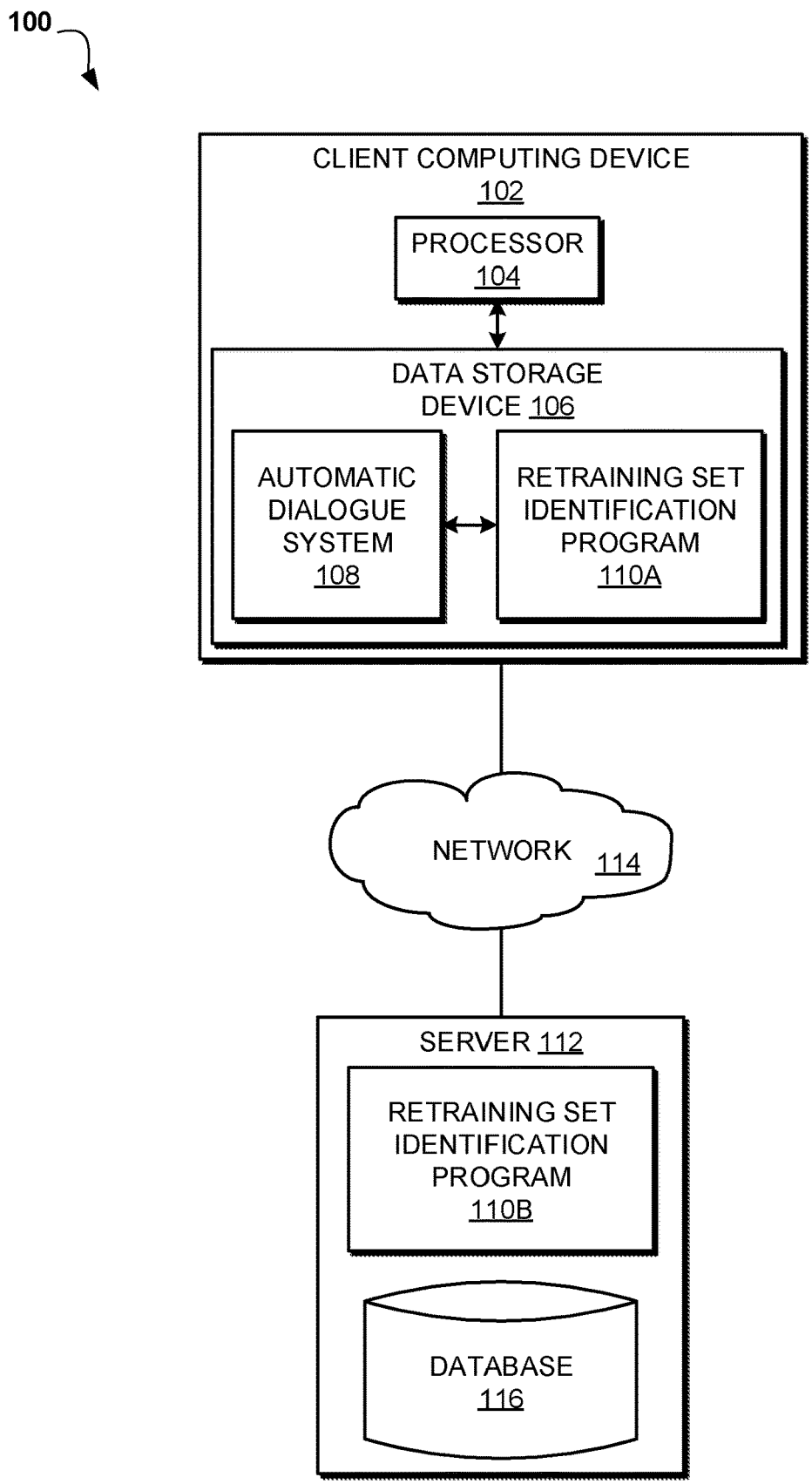
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to natural language processing. The following described exemplary embodiments provide a system, method, and program product to, among other things, generate a new set of data for retraining a classifier by analyzing the records of users interacting with the system and inferring, potentially, a new set of training data for the classifier on which the system is based. Therefore, the present embodiment has the capacity to improve the technical field of natural language processing by allowing dialogue system providers to identify and fix training insufficiencies in a classifier-based dialogue system by incorporating user feedback on whether a response is correct or incorrect into the training data. This allows an automatic dialogue system to learn and improve in accuracy and relevance over time, which is a huge improvement over existing methods which are largely incapable of incorporating indirect user feedback into the training data.

As previously described, natural language processing is a field of computing concerned with in-context interactions between computers and humans using natural languages. As computing power has become cheaper, faster, and more powerful, many companies are rushing to develop personal assistants capable of communicating with humans using natural language based within phones, tablets, computer operating systems and even purpose-built home automation appliances to provide intuitive machine-man interfacing. As such, the field of natural language processing has massively grown in relevance in recent years, and streamlining the process is of immense commercial importance. A primary goal of the field is to enable computers to accurately process a human user's natural language queries. Achieving this goal requires that computers understand not only the denotative meaning of the text, but the connotative meaning as well; the definition of words can change depending on context. Consequently, an understanding of natural language requires an understanding of the context within which that language appears.

In both text-based and spoken language automatic dialogue systems, system responses are based on user input. For instance, if a user asks the system to retrieve a piece of information from a database with a request "can you help me pay my bill?" the system has the task of determining that this is a request for assistance in paying a bill and not a request for the account status or the account balance. In many modern dialogue systems, this determination is made on the basis of the output of a statistical classifier that determines for a given user input which of a small set of input classes, often called "user intents", it is (in this case, for example, the relevant Intents might be HELP, HELP_BILL_PAY, PAY_BILL). There is often significant variability in the success with which the system can identify certain classes of inputs.

Some classes are very simple, while others are not. Furthermore, in statistical classification, a conclusion is often made with a certain confidence, and this confidence influences how the system behaves. If the system's confidence is very high that it has classified the user input correctly, it will return a response that is appropriate to that intent. If the system is less confident it may ask a confirmation question (e.g., "Are you asking for your account's due date?") and if the system is even less confident or cannot make a determination it may request that the user rephrase the input entirely. As such, it may be advantageous to, among other things, implement a system that identifies, on the basis of interaction with a user, which classes are being systemically identified, and which further leverages the confidence values and the implicit (or explicit) feedback of the user to identify classes that require retraining or other types of intervention.

According to one embodiment, the invention is a method for generating data for retraining the classifier based on recorded user interaction with the dialogue system, where for each recorded interaction with the dialogue system the method involves determining, on the basis of clarification dialogue interaction, whether an input from the user should be mapped to a class C, and if so, add the input I class C pair to the retraining list L. The method further entails: for all pair types in the retraining list L, determining whether the pair type is reliable as indicated by the mappings from inputs to class in L; for each pair type deemed reliable, determining if the input is consistently mapped or inconsistently mapped within the retraining list L; for all inconsistently mapped inputs of L, determining whether a consistent submapping can be generated, and, if so, adding this to L in replacement for the inconsistent mapping pairs; and merging all reliable and consistently mapping pairs in L with the initial training set T for retraining the classifier.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate a new set of data for retraining a classifier by analyzing the records of users interacting with the system and inferring, potentially, a new set of training data for the classifier on which the system is based.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an automatic dialogue system 108 and a retraining set identification program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a retraining set identification program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Automatic dialogue system 108 may be any automatic dialogue system which is based on a classifier trained on a set of inputs and classes for which the following conditions hold: the system records elements of its interaction with the user; each input to the system is sent to a classifier for classification, with the classifier returning confidence measures for each class; and the system response is based on the confidence and the class returned as follows: for any input that has high enough confidence in its top confidence class, a response appropriate to that class is returned, which may be implicitly or explicitly indicated as appropriate. If the confidence is too low for a direct response but still high enough based on a threshold, the system may ask the user for confirmation that the top-confidence answer is appropriate. If the original input is classified lower still, the user may be asked to rephrase the input. The input may be a user interaction with the automatic dialogue system, such as a query to "make the music louder." Classes may be executable commands assigned to the input, which, when carried out, would provide a response to the input to resolve the user's query or command; for example, where the input is "make the music louder," the class may be INCREASE_VOLUME. An example of automatic dialogue system 108 may include a personal assistant, such as the Google Home® (Google Home® and all Google Home®-based trademarks and logos are trademarks or registered trademarks of Google Inc. and/or its affiliates), the Amazon Echo® (Amazon Echo® and all Amazon Echo®-based trademarks and logos are trademarks or registered trademarks of Amazon Technologies, Inc. and/or its affiliates), and Ski® (Ski® and all Siri®-based trademarks and logos are trademarks or registered trademarks of Apple Inc. and/or its affiliates).

According to the present embodiment, the retraining set identification program 110A, 110B may be a program capable of generating a new set of data for retraining a classifier by analyzing the records of users interacting with the system and inferring, potentially, a new set of training data for the classifier on which the system is based through a classifier-based automatic dialogue system retraining data identification method. The classifier-based automatic dialogue system retraining data identification method is explained in further detail below with respect to FIG. 2. The retraining set identification program 110A, 110B may be a discrete program or it may be a subroutine or method integrated into automatic dialogue system 108. The retraining set identification program 110A, 110B may be located on client computing device 102 or server 112 or on any other device located within network 114. Furthermore, retraining set identification program 110A, 110B may be distributed in its operation over multiple devices, such as client computing device 102 and server 112.

Figure 2:
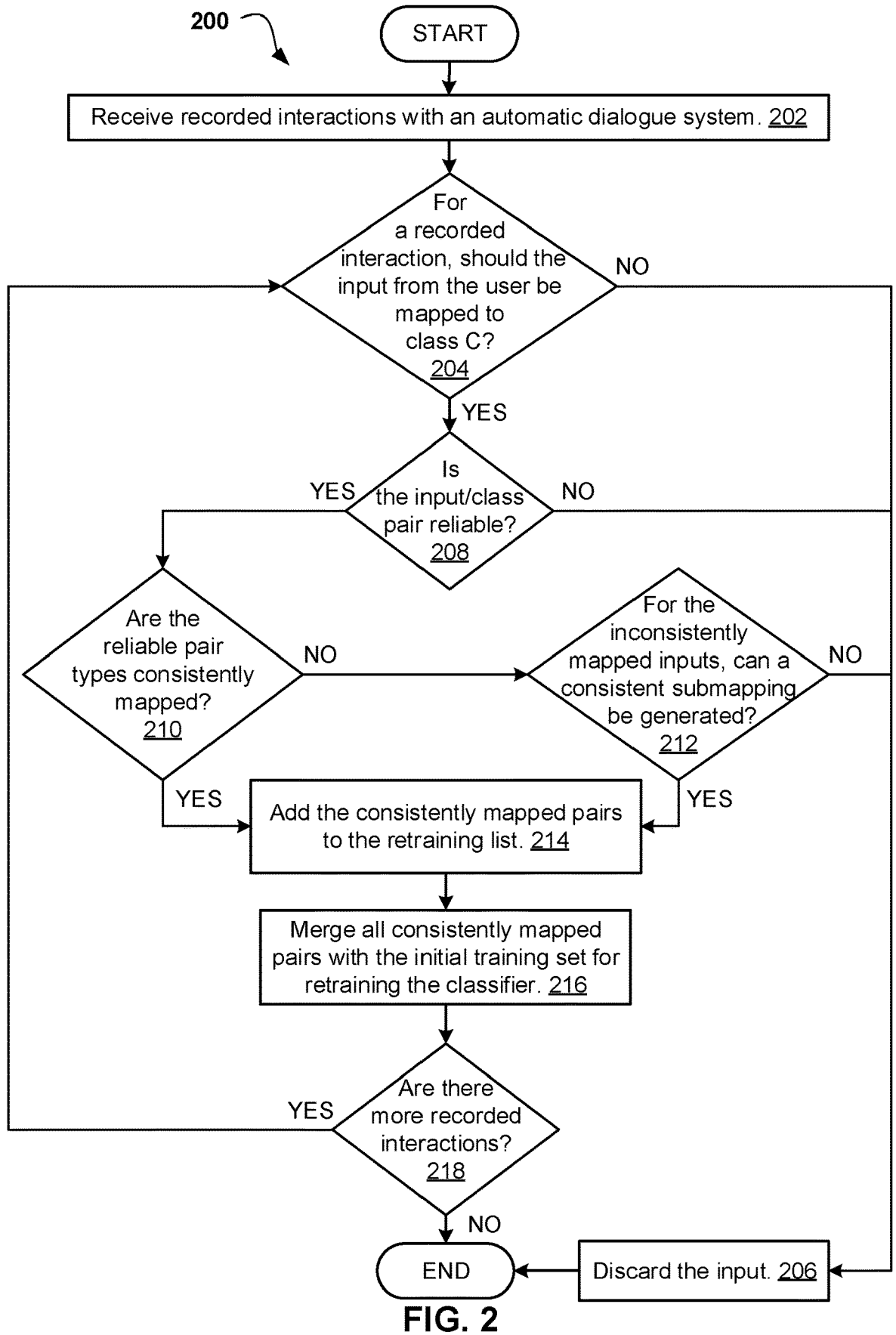
FIG. 2 is an operational flowchart illustrating a classifier-based automatic dialogue system retraining data identification process according to at least one embodiment.

Referring now to FIG. 2, an operational flowchart illustrating a classifier-based automatic dialogue system retraining data identification process 200 is depicted according to at least one embodiment. At 202, the retraining set identification program 110A, 110B receives recorded interactions with an automatic dialogue system 108. The recorded interactions may be interactions between a user and the automatic dialogue system 108, and may be any natural language interaction, including text and spoken language. The recorded interactions may be any interactions where the automatic dialogue system 108 has received input, experienced some degree of uncertainty when classifying that input, asked the user for clarification of the input, and received user input; the recorded interactions may contain all elements of this interaction between the user and the automatic dialogue system 108. For example, a recorded interaction might look like:

USER: I need to figure out how you can help me to do a bill pay.
SYSTEM: I don't understand, please rephrase.
USER: How do I pay my bill?
SYSTEM: Go to the payment page at customer.com.
USER: Thank you.

The received interaction may also contain any classes associated with the input. A class is a command to be associated with a given input which, when executed, results in automatic dialogue system 108 returning a satisfactory response to the input. For example, an example of class C could be the class "INCREASE_VOLUME," which, when executed, increases the volume of an audio playback associated with automatic dialogue system 108. The retraining set identification program 110A, 110B may receive an input, such as "Turn the music up!", and attempt to match an appropriate class to this input, such as "INCREASE_VOLUME." The classes may be assigned to or associated with the input, to varying degrees of certainty, by a classifier in automatic dialogue system 108 prior to receipt of the recorded interactions. These recorded interactions may be received from automatic dialogue system 108, or may be received from any data repository on client computing device 102 or server 112 or on any other device located within network 114, such as data storage device 106 or database 116.

Next, at 204, the retraining set identification program 110A, 110B determines whether, for a recorded interaction, an input from the user should be mapped to class C. Class C may be one of any possible classes, and may be selected from the classes associated with the input as received as part of the recorded interaction in step 202. The retraining set identification program 110A, 110B identifies whether an input should be mapped to class C by analyzing the interaction between the user and automatic dialogue system 108 to determine whether or not the system's response was correct. In a given embodiment, this might proceed as follows: an input I is received by retraining set identification program 110A, 110B which has been primarily associated with $C_0$ and secondarily associated with $C_1$, and which has resulted in the user being asked to clarify that $C_0$ is the intended class for the input I; if the user subsequently does clarify that the class $C_0$ is the correct class, input/class pair $I/C_0$ should be added to the retraining list. Alternately, if an input I is classified as $C_0$, and secondarily classified as $C_1$, and results in the user being asked to rephrase the input where the subsequent rephrasing results in a classification $C_1$ and results in a coherent subsequent interaction in which the user indicates explicitly or implicitly that R's classification as $C_1$ was appropriate, then input/class pair $I/C_1$ should be added to the retraining list. For example, a recorded interaction might look like:

USER: I need to figure out how you can help me to do a bill pay.
SYSTEM: I don't understand, please rephrase.
(C0: HELP_USER; C1: PAY_BILL; C2: BILL_HELP)
USER: How do I pay my bill?
SYSTEM: Go to the payment page at customer.com.
(C1: PAY_BILL; C2: BILL_HELP)
USER: Thank you.

In this interaction, the user indicates that the original input is likely to have been properly classified as PAY_BILL, so the pair [(I need to figure out how you can help me to do a bill pay), PAY_BILL] is added to the retraining list. The retraining set identification program 110A, 110B may use any natural language processing method to parse the interaction. According to one implementation, if the retraining set identification program 110A, 110B determines that for a recorded interaction, an input from the user should not be mapped to class C, (step 204, "NO" branch), the retraining set identification program 110A, 110B may continue to step 206 to discard the input. If the retraining set identification program 110A, 110B determines that for the recorded interaction, the input from the user should be mapped to class C (step 204, "YES" branch), the retraining set identification program 110A, 110B may continue to step 208 to determine whether the input/class pair is reliable.

Then, at 206, retraining set identification program 110A, 110B discards the input. If the input cannot be mapped to a class, is not reliable, or is inconsistently mapped and no consistent submapping can be generated, the input is not useful to retraining set identification program 110A, 110B in extrapolating useful data to retrain the training data. In such cases, retraining set identification program 110A, 110B has no further use of the input in question and may discard it, either by deleting it from the corpus of received interactions, by marking it either by metadata or location, or any other method.

Next, at 208, the retraining set identification program 110A, 110B determines whether the input/class pair is reliable. An input/class pair may be reliable if the class has been mapped to the input more than once. In different implementations, the number of times a class has been mapped to the input may vary depending on the desired level of reliability; the greater the number of times a given class has been mapped to a given input, the greater the reliability of that input/class pair. Conversely, the lower the number of times a class and input have been matched, the less reliable that pair is. The retraining set identification program 110A, 110B may determine whether an input/class pair is reliable by comparing the number of times a given class has been matched to a given input against a threshold, where the threshold represents the number of times a class must be matched with an input to be considered reliable. This threshold may be supplied to the retraining set identification program 110A, 110B by a user, by automatic dialogue system 108, or may be dynamically generated in response to feedback. According to one implementation, if the retraining set identification program 110A, 110B determines that the pair is not reliable, (step 208, "NO" branch), the retraining set identification program 110A, 110B may continue to step 206 to discard the input. If the retraining set identification program 110A, 110B determines that the pair is reliable (step 208, "YES" branch), the retraining set identification program 110A, 110B may continue to step 210 to determine whether the reliable pair types are consistently mapped.

Then, at 210, the retraining set identification program 110A, 110B determines whether the input/class pair is consistently mapped. An input/class pair may be consistently mapped if the same input is regularly mapped to the same class or classes, with as few outliers as possible. This may be done by identifying inputs which are paired with more than one class; for example, the input (I need to figure out how you can help me to do a bill pay) is consistent in the following list: [(I need to figure out how you can help me to do a bill pay), PAY_BILL], [(I need to figure out how you can help me to do a bill pay), PAY_BILL]; however, that same input is inconsistent in the following list: [(I need to figure out how you can help me to do a bill pay), PAY_BILL], [(I need to figure out how you can help me to do a bill pay), HELP], [(I need help), HELP]. The consistency with which an input is matched to a class may be modified by a user, retraining set identification program 110A, 110B, automatic dialogue system 108, or any other entity to tolerate more or fewer outliers based on the desired accuracy. According to one implementation, if the retraining set identification program 110A, 110B determines that the pair is not consistently mapped, (step 210, "NO" branch), the retraining set identification program 110A, 110B may continue to step 212 to determine whether, for the inconsistently mapped inputs, a consistent submapping can be generated. If the retraining set identification program 110A, 110B determines that the pair is consistently mapped (step 210, "YES" branch), the retraining set identification program 110A, 110B may continue to step 214 to add the consistently mapped pairs to the retraining list.

Next, at 212, the retraining set identification program 110A, 110B determines whether, for the inconsistently mapped pairs, a consistent submapping can be generated. In one embodiment, retraining set identification program 110A, 110B may determine whether a consistent submapping can be generated by taking the classes that the input is mapped to, and determining whether any of those classes are selected more than a specified threshold fraction of the time, where the threshold may be pre-supplied to or determined by retraining set identification program 110A, 110B. In another embodiment, retraining set identification program 110A, 110B may send the inconsistently mapped pairs to a user such as a system administrator or engineer to hand-curate the pairs and try to identify a submapping, which the user may then return to retraining set identification program 110A, 110B. Further embodiments may employ a mix of the two approaches, for instance, if none of the classes occur enough of the time to exceed the specified threshold, then the inconsistent pairs may be passed to a user for manual review. According to one implementation, if the retraining set identification program 110A, 110B determines that, for the inconsistently mapped pairs, a consistent submapping cannot be generated, (step 212, "NO" branch), the retraining set identification program 110A, 110B may continue to step 206 to discard the input. If the retraining set identification program 110A, 110B determines that, for the inconsistently mapped pairs, a consistent submapping can be generated (step 212, "YES" branch), the retraining set identification program 110A, 110B may continue to step 214 to add the consistently mapped pairs to the retraining list.

Then, at 214, the retraining set identification program 110A, 110B adds the consistently mapped pairs to the retraining list. The retraining list may be the list of input/class pairs that are to be merged into the training data of the classifier within automatic dialogue system 108, and may contain pairs that are reliable and are consistently mapped, or contain a consistent submapping.

Next, at 216, the retraining set identification program 110A, 110B merges all consistently mapped pairs with the initial training set for retraining the classifier. The initial training set may be the set of data, which may include input/class pairs, that was used to initially retrain the classifier. The retraining set identification program 110A, 110B may merge the consistently mapped pairs with the initial training set by removing any pair from the retraining list that shares an input with a pair from the initial training set, but not a class, and forming the union of the remaining pairs from the retraining list with the initial training set.

Then, at 218, the retraining set identification program 110A, 110B determines whether there are any more recorded interactions. The retraining set identification program 110A, 110B may determine this simply by accessing the corpus of recorded interactions and checking for any interactions that have not been processed. Processed interactions may be marked with metadata at the time of their processing, may be moved to a different location, or may be marked in some other fashion. According to one implementation, if the retraining set identification program 110A, 110B determines that there are more recorded interactions, (step 218, "YES" branch), the retraining set identification program 110A, 110B may continue to step 204 to, for a recorded interaction, determine whether the input from the user should be mapped to class C. If the retraining set identification program 110A, 110B determines that there are no more recorded interactions, (step 218, "NO" branch), the retraining set identification program 110A, 110B may terminate.

It may be appreciated that FIG. 2 provides only an illustration of one implementation and does not imply any limitations with regard to how different embodiments may be implemented. Many modifications to the depicted environments may be made based on design and implementation requirements.

Figure 3:
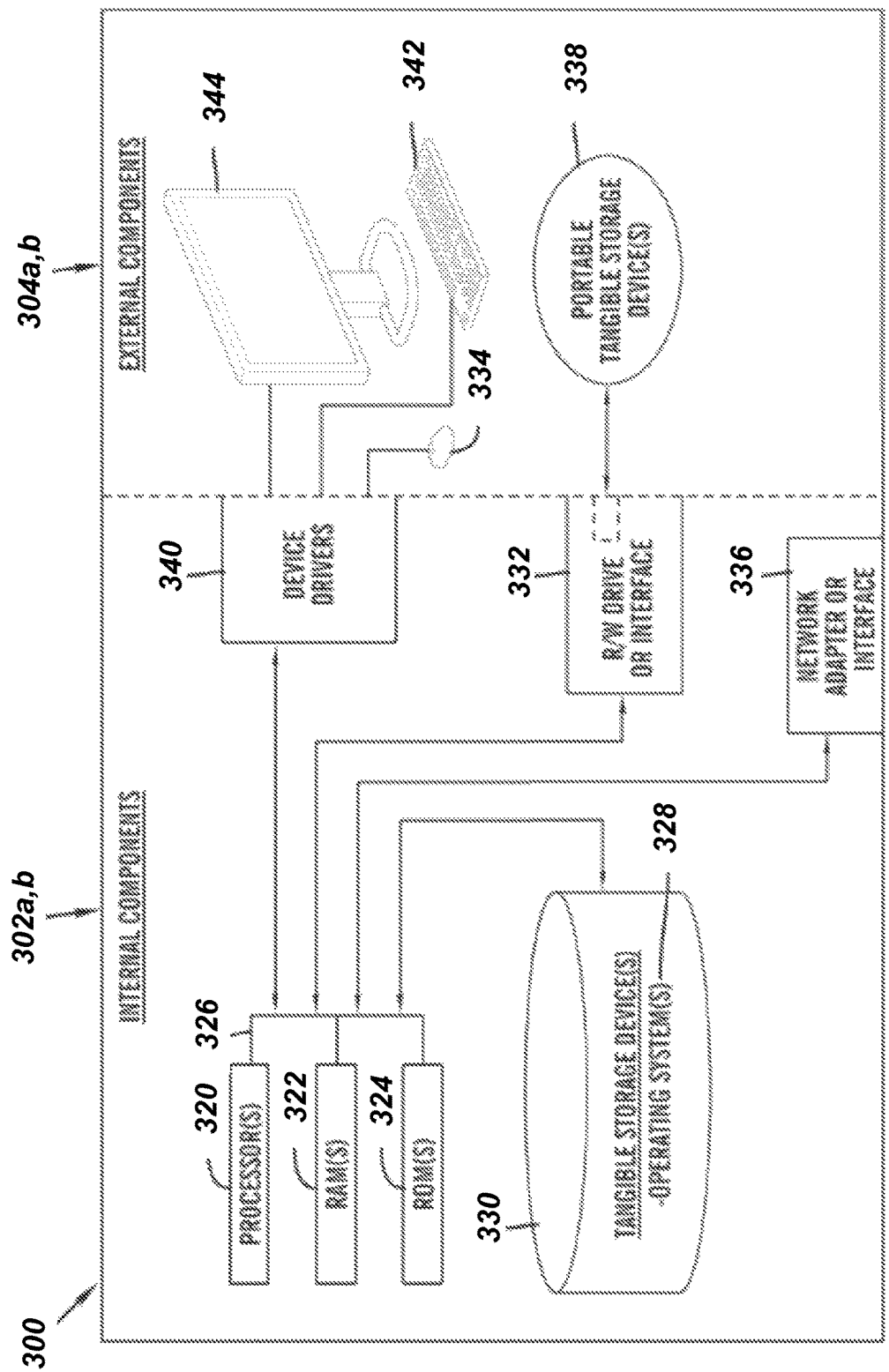
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the automatic dialogue system 108 and the retraining set identification program 110A in the client computing device 102, and the retraining set identification program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the retraining set identification program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The automatic dialogue program 108 and the retraining set identification program 110A in the client computing device 102 and the retraining set identification program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the automatic dialogue system 108 and the retraining set identification program 110A in the client computing device 102 and the retraining set identification program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
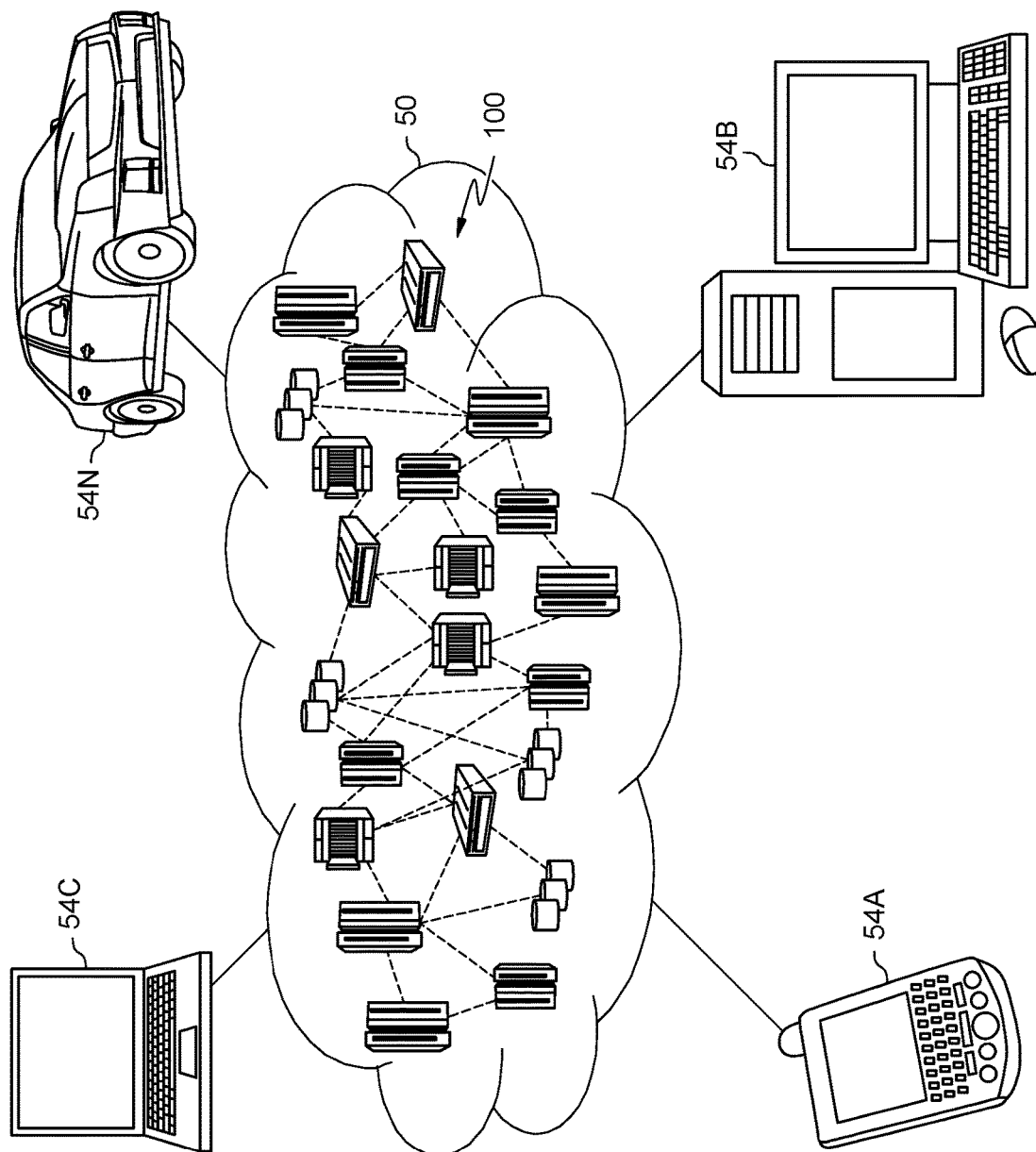
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
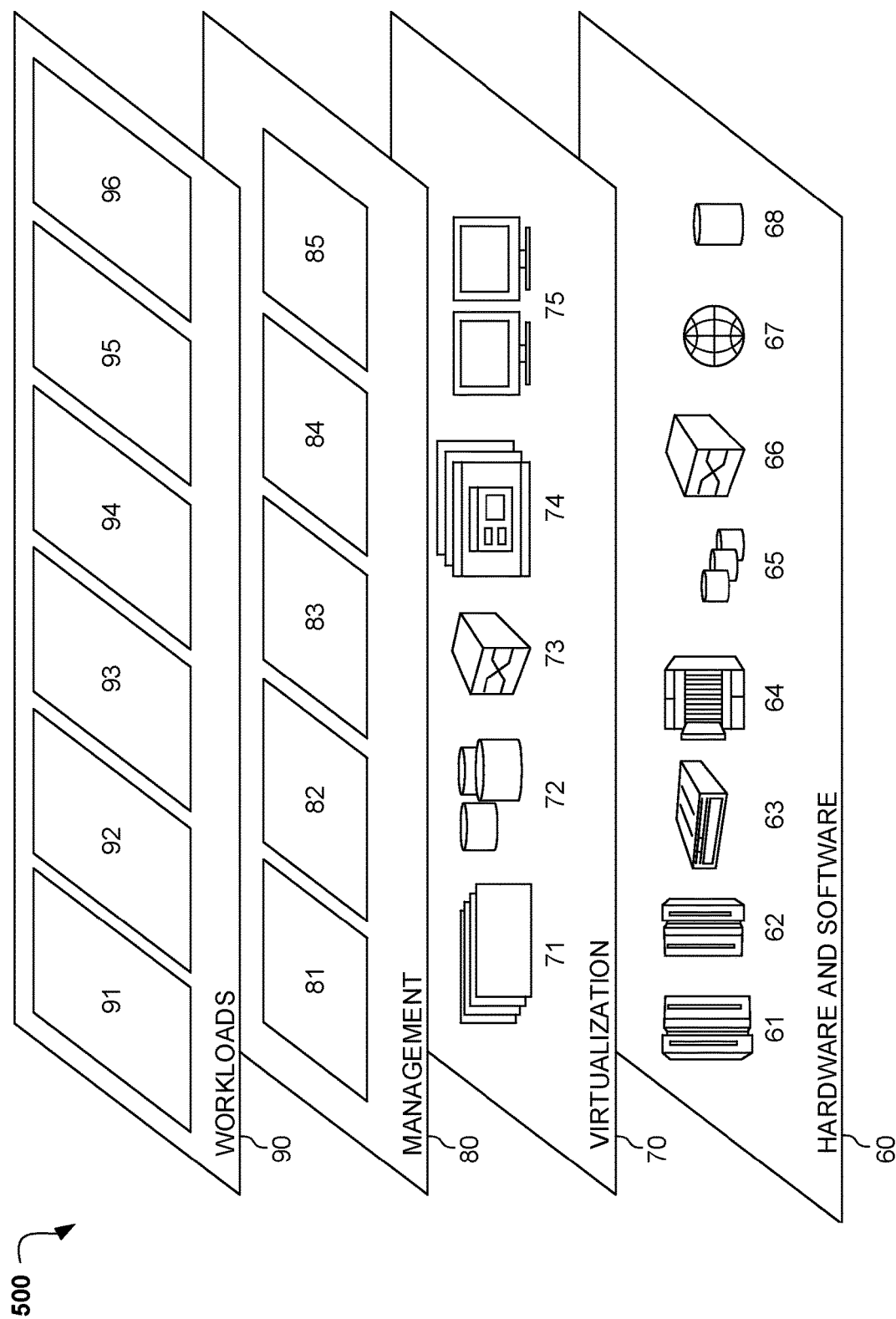
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and classifier-based automatic dialogue system retraining data identification 96. Retraining data identification 96 may relate to generating a new set of data for retraining a classifier by analyzing the records of users interacting with the system and inferring, potentially, a new set of training data for the classifier on which the system is based.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for identifying data for retraining a classifier-based automatic dialogue system with one or more recorded user interactions, the method comprising:
    assessing, based on the one or more recorded user interactions, a reliability of one or more paired inputs and classes;
    determining whether the one or more reliable paired inputs and classes can be consistently mapped; and
    merging all consistently-mapped, reliable, paired inputs and classes with an initial training set.

2. The method of claim 1, wherein the one or more recorded interactions further comprise:
    one or more inputs by a user and one or more responses by the automatic dialogue system;
    one or more classes, ranked according to a confidence level, for each of the one or more inputs; and
    for one or more classes where the confidence level is below a threshold, one or more system responses asking the user for confirmation that a class with a highest confidence level is appropriate.

3. The method of claim 1, wherein the one or more inputs are paired with the one or more classes by analyzing the one or more inputs to identify whether the user indicated a class of the one or more classes to be appropriate or inappropriate.

4. The method of claim 1, wherein assessing the reliability of the one or more paired inputs and classes further comprises:
comparing a number of times a class has been mapped to an input against a threshold.

5. The method of claim 1, wherein a given paired input and class is consistently mapped if the one or more inputs are mapped to the same one or more classes over one or more user interactions, and wherein a number of outlying classes fall below a threshold value.

6. The method of claim 1, further comprising:
for one or more paired inputs and classes which are not consistently mapped, determining whether a consistent submapping can be generated.

7. The method of claim 6, wherein determining whether a consistent submapping uses one or more methods selected from a group consisting of:
comparing a percentage that any of one or more classes paired with an input are selected against a threshold, and sending a plurality of inconsistently mapped paired inputs and classes to one or more users for manual determination.

8. A computer system for identifying data for retraining a classifier-based automatic dialogue system with one or more recorded user interactions, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
assessing, based on the one or more recorded user interactions, a reliability of one or more paired inputs and classes;
determining whether the one or more reliable paired inputs and classes can be consistently mapped; and
merging all consistently-mapped, reliable, paired inputs and classes with an initial training set.

9. The computer system of claim 8, wherein the one or more recorded interactions further comprise:
one or more inputs by a user and one or more responses by the automatic dialogue system;
one or more classes, ranked according to a confidence level, for each of the one or more inputs; and
for one or more classes where the confidence level is below a threshold, one or more system responses asking the user for confirmation that a class with a highest confidence level is appropriate.

10. The computer system of claim 8, wherein the one or more inputs are paired with the one or more classes by analyzing the one or more inputs to identify whether the user indicated a class of the one or more classes to be appropriate or inappropriate.

11. The computer system of claim 8, wherein assessing the reliability of the one or more paired inputs and classes further comprises:
includes comparing a number of times a class has been mapped to an input against a threshold.

12. The computer system of claim 8, wherein a given paired input and class is consistently mapped if the one or more inputs are mapped to the same one or more classes over one or more user interactions, and wherein a number of outlying classes fall below a threshold value.

13. The computer system of claim 8, further comprising:
for one or more paired inputs and classes which are not consistently mapped, determining whether a consistent submapping can be generated.

14. The computer system of claim 8, wherein determining whether a consistent submapping uses one or more methods selected from a group consisting of:
comparing a percentage that any of one or more classes paired with an input are selected against a threshold, and sending a plurality of inconsistently mapped paired inputs and classes to one or more users for manual determination.

15. A computer program product for identifying data for retraining a classifier-based automatic dialogue system with one or more recorded user interactions, the computer program product comprising:
one or more computer-readable tangible storage medium and program instructions stored on at least one of the one or more tangible storage medium, the program instructions executable by a processor to cause the processor to perform a method comprising:
assessing, based on the one or more recorded user interactions, a reliability of one or more paired inputs and classes;
determining whether the one or more reliable paired inputs and classes can be consistently mapped; and
merging all consistently-mapped, reliable, paired inputs and classes with an initial training set.

16. The computer program product of claim 15, wherein the one or more recorded interactions further comprise:
one or more inputs by a user and one or more responses by the automatic dialogue system;
one or more classes, ranked according to a confidence level, for each of the one or more inputs; and
for one or more classes where the confidence level is below a threshold, one or more system responses asking the user for confirmation that a class with a highest confidence level is appropriate.

17. The computer program product of claim 15, wherein the one or more inputs are paired with the one or more classes by analyzing the one or more inputs to identify whether the user indicated a class of the one or more classes to be appropriate or inappropriate.

18. The computer program product of claim 15, wherein assessing the reliability of the one or more paired inputs and classes further comprises:
comparing a number of times a class has been mapped to an input against a threshold.

19. The computer program product of claim 15, wherein a given paired input and class is consistently mapped if the one or more inputs are mapped to the same one or more classes over one or more user interactions, and wherein a number of outlying classes fall below a threshold value.

20. The computer program product of claim 15, further comprising:
for one or more paired inputs and classes which are not consistently mapped, determining whether a consistent submapping can be generated.

* * * * *